United States Patent [19]
Loewe et al.

[11] Patent Number: 5,126,774
[45] Date of Patent: Jun. 30, 1992

[54] LIGHTTIGHT CASSETTE

[75] Inventors: Erhard E.W. Loewe, Waldesch; Otfried Urban, Wiesbaden, both of Fed. Rep. of Germany

[73] Assignee: E. I. Du Pont de Nemours and Company, Wilmington, Del.

[21] Appl. No.: 663,005

[22] Filed: Mar. 1, 1991

[30] Foreign Application Priority Data

Mar. 1, 1990 [DE] Fed. Rep. of Germany ... 9002409[U]

[51] Int. Cl.$^5$ .............................................. G03B 17/26
[52] U.S. Cl. ................................. 354/275; 242/71.1; 242/75.4
[58] Field of Search ................. 354/275; 242/71, 71.1, 242/71.7, 75.4

[56] References Cited

U.S. PATENT DOCUMENTS 3,612,424 10/1971 Friedel .............................. 242/71.1
4,398,814 8/1983 Muylle et al. ...................... 354/275

Primary Examiner—L. T. Hix
Assistant Examiner—Howard B. Blankenship
Attorney, Agent, or Firm—Thomas H. Magee

[57] ABSTRACT

A lighttight cassette has a housing including a wall surrounding the periphery of a roll of web material supported therein. The housing also includes two ends, connected through the wall of the housing, on which the roll is supported in a rotatable manner. The cassette has an externally operated brake device that applies an adjustable friction locking between an end surface of the roll and the adjacent end wall, thereby preventing unwanted unwinding of the film during transportation and storage.

12 Claims, 2 Drawing Sheets

LIGHTTIGHT CASSETTE

BACKGROUND OF THE INVENTION

1. Field of the Invention

This invention pertains to a lighttight cassette with a roll of web material, the cassette housing having a wall surrounding the periphery of the roll and two ends connected through the housing wall, on which ends the roll is supported in a rotatable manner.

2. Description of Related Art

As a rule, the web material is light-sensitive film or paper needed in an exposure device to reproduce originals or to make negatives for the exposure of printing plates. Such cassettes generally have to fulfill two opposing requirements. First, the roll must be supported with the least possible friction to assure easy and smooth transport of the film into the exposure device. This is particularly important in end uses, such as, for example, in certain scanners, where the film is exposed during transport. Each irregularity in transport rate would produce distortions in the exposed image on the film. Secondly, the web material, that is, the film, must not unroll by itself or twist during transport of the cassette to and from the exposure device or while the cassette is stored; the lower the friction of the support bearing, the more easily this occurs. In this event, there is the risk that the film may touch the housing wall and is scratched.

In one known cassette (U.S. Pat. No. 3,612,424), the roll is supported in the cassette on a continuous axis that connects the two end walls together. The axis runs through one end wall and can be provided there with a nut. By the nut being tightened, the end walls are moved towards each other and clamp the roll between them. When the nut is loosened, the end walls move away from each other and the roll is then freely mobile. This design has the disadvantage of relatively high production cost. It can be used only with a continuous axis that connects the two end walls together. Furthermore, tightening the nut produces stresses in the housing, especially the housing wall, which can deform individual housing parts; for example, the stresses can bend the housing wall outwards. Deformation can cause gaps in the contact points or joints between the individual cassette parts, permitting light to enter the interior of the cassette. This is particularly undesirable in cassettes for light-sensitive material.

German OS 21 66 321 discloses a film roll clamped permanently onto both ends so that the film roll can be unwound only against a predetermined resistance, determined by the clamping mechanism. In this instance, as the roll radius decreases, gradually increasing force is required to unroll the film at uniform speed. In each case, sometimes considerable friction must be overcome.

U.S. Pat. No. 4,398,814 discloses a twist preventative in the form of a retention pin that is eliminated when the film is first unrolled. This is only a transport security device that is broken off irreversibly before use. If the cassette has to be made secure for later transport because, for example, another film material has to be used before the entire original content of the cassette is expended, the risk of twist arises again and especially so if the cassette is partially empty.

The object of the present innovation is to provide a lighttight cassette that offers protection from roll twist and that is easy to make and use.

SUMMARY OF THE INVENTION

The present invention comprises a lighttight cassette having a housing which includes a wall surrounding the periphery of a roll of web material supported therein. The housing also includes two ends, connected through the wall of the housing, on which the roll is supported in a rotatable manner. The cassette has an externally operated brake device that applies an adjustable friction locking between an end surface of the roll and the adjacent end wall, thereby preventing unwanted unwinding of the film during transportation and storage.

DETAILED DESCRIPTION OF THE PREFERRED EMBODIMENTS

Figure 1:
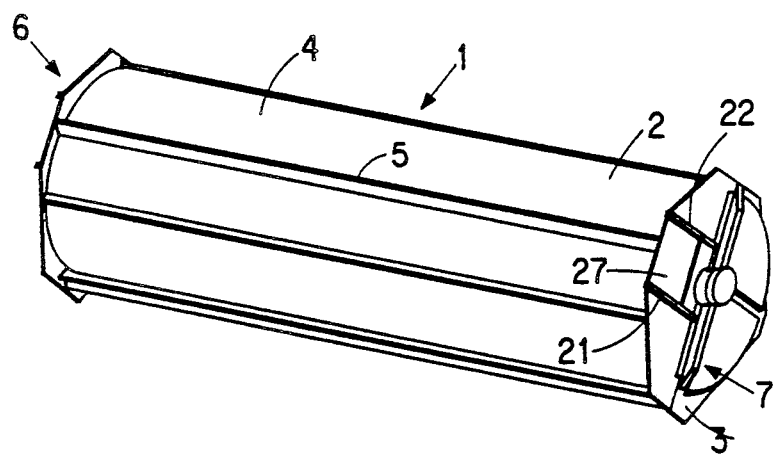
FIG. 1 is a perspective view showing the cassette without attached, clamping elements.
Figure 2:
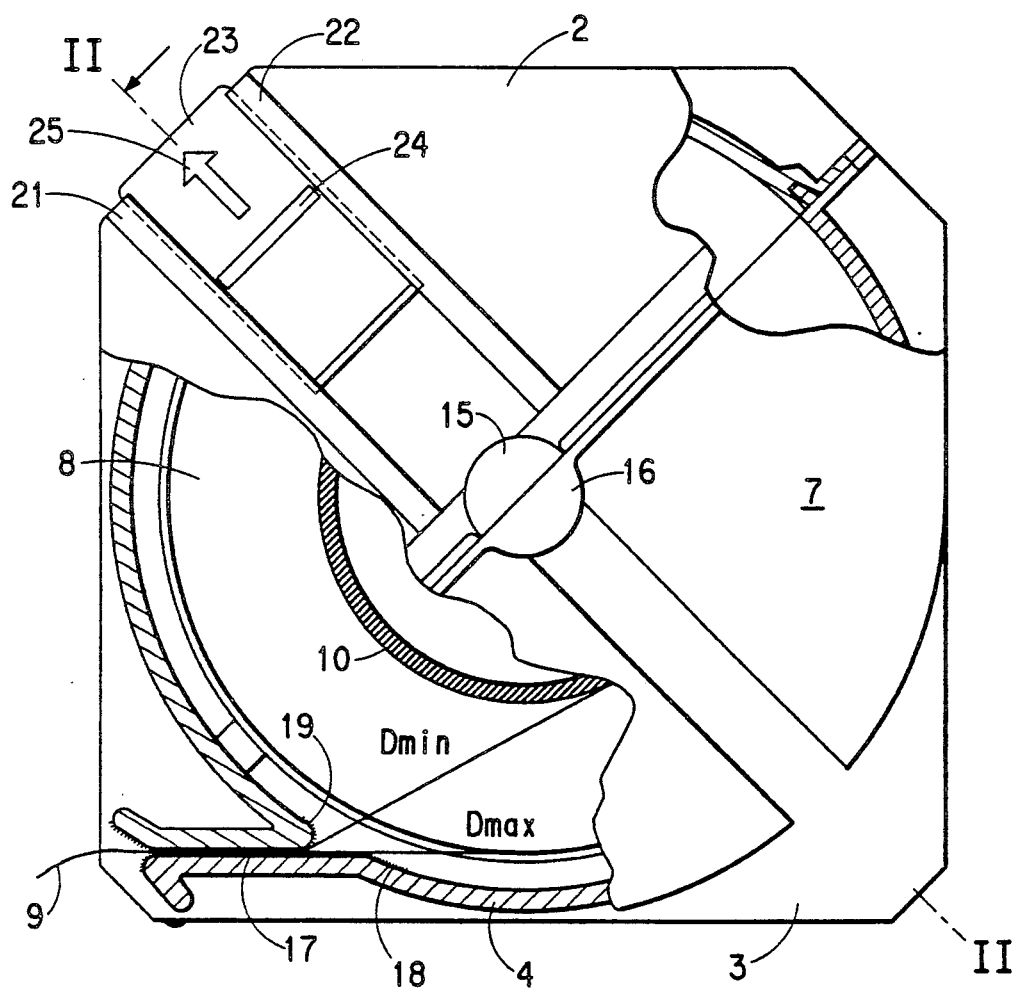
FIG. 2 is an end, partially cutaway view showing the preferred embodiment of the cassette.
Figure 3:
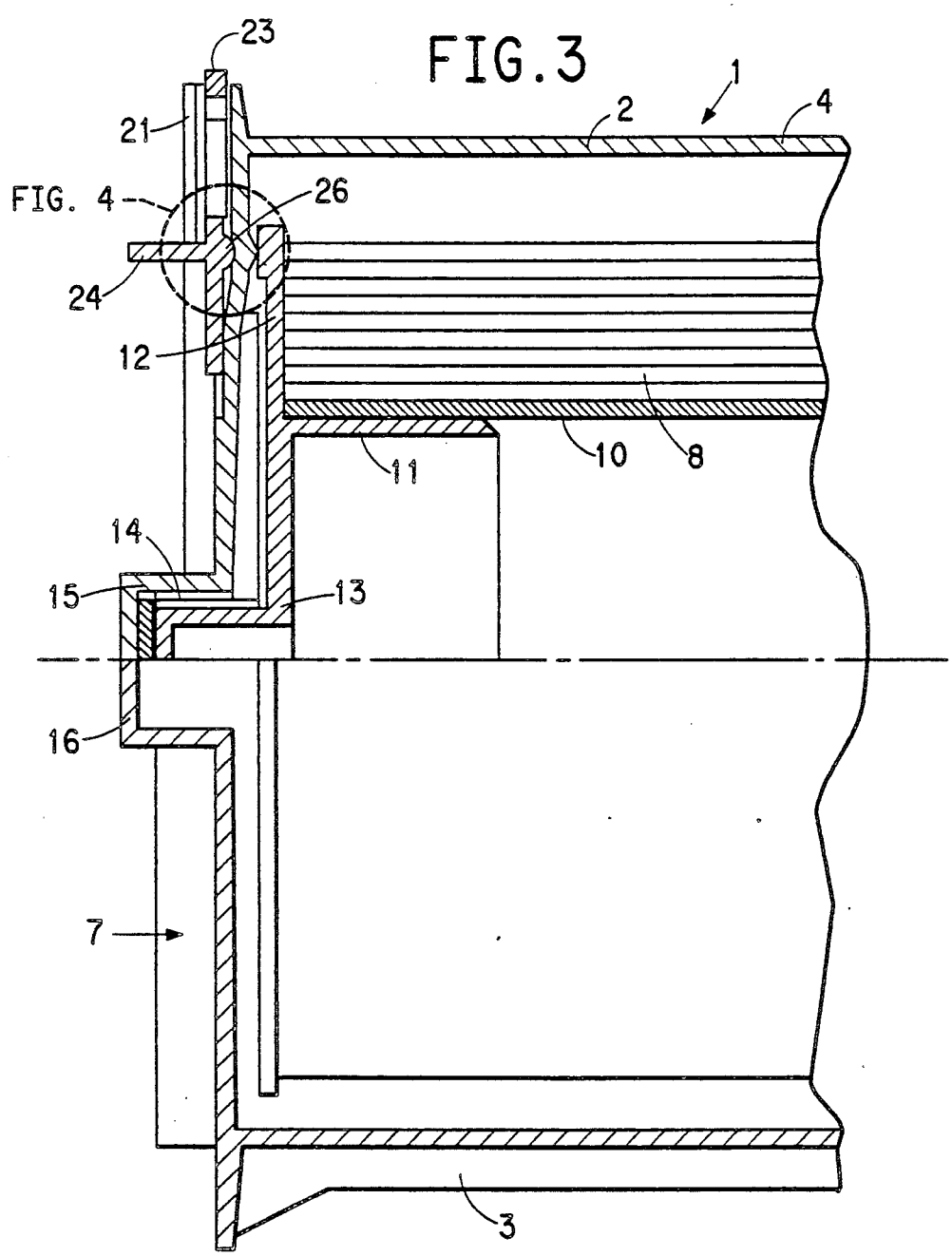
FIG. 3 is a cross-sectional view through line II—II of FIG. 2.

FIGS. 1 through 3 show a cassette 1 having a top part 2 and a bottom part 3 put together so that the joint is lighttight. The cassette 1 has a housing wall 4, braced by reinforcing ribs 5, and two end walls 6, 7 connected by the housing wall 4. The housing wall 4 encloses the periphery of a roll 8 of a web material 9, particularly a light-sensitive film on a cardboard core 10. The material 9 and the cardboard core 10 have the same width. The cardboard core 10 is inserted at both ends onto a bearing flange 11 joined to a flanged disk 12. The flanged disk abuts the roll 8 and thus prevents the film 9 from telescoping. In addition, the flanged disk 12 connects the bearing flange 11 with a journal 13 supported by an inset of a bearing box 14 in a bearing formed from two bearing shells 15, 16. In this manner, the roll 8 can rotate freely, that is, with little friction, in the cassette 1.

FIG. 2 shows how the material 9 is passed through a slot 17 formed between the top part 2 and the bottom part 3; the slot 17 extends approximately parallel to the axis of the roll 8. Both sides of the slot 17 are provided with a lining 18, 19 of velvet, plush, or the like to seal the slot 17 against stray light and simultaneously to prevent damage to the film 9 by scratching or the like. FIG. 2 shows the course of the film 9 for the maximum diameter $D_{max}$, that is, for a full roll 8, and for the minimum diameter $D_{min}$, that is, a completely empty roll 8.

Both ends 6, 7 have two rails 21, 22 extending approximately perpendicularly to the joint between the top part 2 and the bottom part 3. The rails are provided only on the part of the ends 6, 7 associated with top part 2. A clamping element 23 is inserted into the rails 21, 22. The space between the inner side of the rails and the respective end wall increases with decreasing distance from the joint between the top part 2 and the bottom part 3. The clamping element 23 has a handle 24 and an indicator mark 25 to show in which direction the clamping element is to be moved to release the locking action on the roll 8. On the face of the clamping element 23 away from the handle 24 is a rounded protrusion 26 that slides on the outer side of the end wall 7. When the clamping element 23 is moved downward, that is, in the direction of the joint between the top part 2 and the bottom part 3, in the rails 21, 22, the protrusion 26 applies increasing pressure on the wall of the end element 7, which has a thin wall sector 27, and moves the wall inwards, that is, onto the end surface of the roll 8. The clamping element can be slid in the top part 2 to the end of the rails 21, 22 in the direction of the joint. In this position, the thin wall sector 27 in the end 7 is moved the farthest in the direction of the roll 8 into the interior of the cassette.

Figure 4:
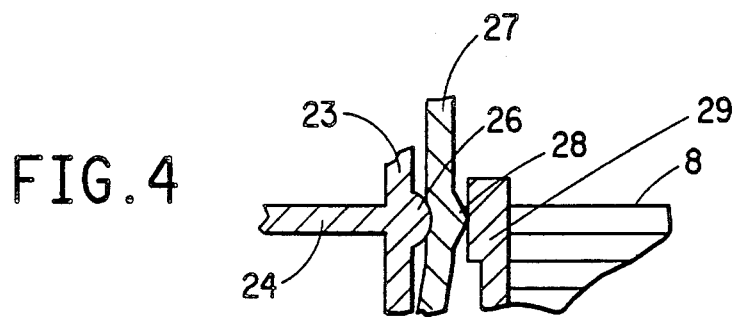
FIG. 4 is an enlarged detail view showing a circled section from FIG. 3.

FIG. 4 shows that, at this position, the end wall 7 has a projection 28. The flanged disk 12 has a peripheral flange 29 on a radius opposite this projection 28. Sliding the clamping element 23 in the rails 21 and 22, thus generates a very firm friction lock of the end wall 7 with the roll 8, or more accurately, its flanged disk 12. In the position shown in FIG. 3, the clamping element 23 thus reliably prevents the roll 8 from rotating.

The stress caused by the clamping element 23 in the end wall is limited to the thin wall sector 27. There is no risk of deforming the top part 2 or the bottom part 3 and thus opening the joint between the two parts. This assures that the cassette 1 is also lighttight in the locked position.

For release from the locked position, the clamping element 23 is merely shifted outwards, for example, until the protrusion 26 is at the top of the housing wall 4. The clamping element 23 can also be removed completely from the rails 21, 22. To relock the roll 8, for example, if a partially emptied cassette 8 has to be removed from an exposure apparatus, the clamping element 23 has only to be reinserted into the rails 21, 22.

The above-described clamping structure provides, on at least one end of the cassette 1, an externally controllable brake device that, in a predetermined angle sector, effects an adjustable friction lock between the end wall and the associated end surface of the roll. Before the cassette is used, the brake device is loosened so that the friction lock between the end wall of the housing and the end surface of the roll is released. The roll can then be unwound in a manner such that only the bearing friction of the roll has to be overcome. If the cassette has to be transported, for example, after being loaded, or if a film change is required in the exposure equipment, the brake device is actuated so that the end wall comes into friction contact with the end surface of the roll. This does not mean that the roll can no longer be rotated. The force or holding moment must only be great enough to oppose the internal tension of the roll that would result in twisting. As, in this manner, the brake device acts only in a predetermined angle segment on the end surface of the roll, stresses in the housing are largely avoided. It is no longer necessary to have, between the two end walls, a conventional tensioning device that can also deform the housing wall. The brake device on the end wall operates self-sufficiently for all practical purposes.

It is advantageous for the brake device to generate the friction lock in a sector between a predetermined first and a predetermined second radius on the end surface. The braking moment can be determined easily by the selection of this sector. The farther away this sector is from the location of the friction lock, the lower must be the force applied by the friction lock in order to produce a predetermined moment of braking. Furthermore, with this arrangement, it is necessary only to deform a relatively small sector of the end in the radial direction, so that stresses in the housing are readily avoided.

A preferred embodiment is a two-piece housing having a top part and a bottom part, each comprising a part of the housing wall and both end surfaces. This embodiment really shows the advantage of the innovation. As the two end walls do not have to be moved toward each other, this eliminates the risk that possible stresses in the housing wall will produce a gap in the joint between the top and bottom parts, particularly in the film dispensing slot. On the other hand, such a cassette can be easily loaded in the sense that a roll can be placed in the prefabricated bottom part, and then the top part is put in place. After the brake device is actuated, the cassette is ready for transport.

It is advantageous for the brake device to be positioned only on the top part or only on the bottom part. Positioning the brake device on only one of the two parts simplifies production. The brake device can be prefabricated on the top part or on the bottom part. When the top and bottom parts are joined, a complex connection for the brake device is not needed.

It is advantageous for the brake device to have a clamping element that is operated externally on rails on the end wall and, at a predetermined location, applies pressure on and bends inward a part of the end wall located between the rails. The area of the end wall under pressure yields inwardly under the pressure, so that it comes into contact with the end area of the roll and together they produce a friction lock. The area that has to yield is thus kept relatively small. Therefore, stresses in the housing are largely avoided. In this embodiment, it is preferable to have the end wall between the rails slightly thinner, particularly at the point where the clamping element applies pressure. This facilitates the deformation by pressure.

It is desirable for the end wall to have a slight protrusion on its inner surface at the point where the clamping element applies pressure. The protrusion, which has a relatively small surface contacting the end surface of the roll, makes it possible for the pressure applied by the clamping element to be converted into a much greater pressure that the protrusion applies against the end surface of the roll. The use of pliable material on the end surface of the roll permits in practice a transition from a friction lock to a fixed lock.

To release the lock of the brake device, the clamping element can be removed completely from the cassette. However, it is also advantageous to be able to move it to a position in which it does not apply pressure on the end wall. This reduces the risk of losing the clamping element.

In a preferred embodiment, the roll has at least one flanged disk at the end on which the brake device is located. A flanged disk is a disk that covers the end of the roll and prevents the roll from telescoping. In the innovation, the flanged disk is now also used to enable a friction locking action with the end wall. This has the advantage that the friction locking action can take place with a large and always constant radius without concern that braking the roll might not be possible as the diameter of the roll decreases. This also prevents damage to the web material from the roll touching the end wall.

It is advantageous for the flanged disk to have a peripheral flange facing outwards in the axial direction, against which the brake device generates the friction lock. The flange reinforces the disk and resists the pressure applied through the end wall, thus improving the friction lock. On the other hand, the entire flanged disk does not have to be as thick as the flange, because this would increase the price and weight of the cassette. Only in the flange area is there a relatively small space between the flanged disk and the end wall that must be bridged by the movement of the end wall due to the pressure applied by the brake device. It is also advantageous for the flange to be located in the region of the largest diameter of the flanged disk. This produces the greatest braking moment at constant brake pressure. It is especially advantageous for the flange surface facing the end wall to have a high friction structure, in particular, a radial corrugation. This requires considerably lower pressure for the same braking moment.

What is claimed is:

1. In a lighttight cassette having a housing including a wall adapted to enclose the periphery of a roll of web material, said housing also including two end walls connected through the housing wall and supporting said roll in a rotatable manner, the improvement comprising said cassette (1) having, on at least one end (6, 7) thereof, an externally operable brake device (23, 27, 24), said brake device including means for applying, in a predetermined angle sector, an adjustable friction locking action between the end wall (7) and an associated end surface of the roll (8).

2. Cassette in accordance with claim 1, characterized in that the brake device (23, 27, 29) applies the friction locking action in an area between a predetermined first and a predetermined second radius on the end surface.

3. Cassette in accordance with claim 1, characterized in that the housing is a two-piece unit and has a top part (2) and a bottom part (3), whereby the top part (2) and the bottom part (3) each comprise a part of the housing wall (4) and both end surfaces (6, 7).

4. Cassette in accordance with claim 3, characterized in that the brake device (23, 27) is located only on the top part (2) or only on the bottom part (3).

5. Cassette in accordance with claim 1, characterized in that the brake device has a clamping element (23) that is moved in rails (21, 22) on the exterior of the end wall (6, 7), and in a predetermined position, applies pressure on and bends inward a segment (27) of the end wall (6, 7), the segment being located between the rails.

6. Cassette in accordance with claim 5, characterized in that the end wall (7) between the rails (21, 22), particularly at the point (27) where pressure is applied by the clamping element (23), is formed with reduced thickness.

7. Cassette in accordance with claim 5, characterized in that the end wall (6, 7) has a protrusion (28) on its inner side at the point where the clamping element (23) applies pressure.

8. Cassette in accordance with claim 5, characterized in that the clamping element (23) can be shifted into a position where it applies no pressure on the end wall (6, 7).

9. Cassette in accordance with claim 1, characterized in that the roll (8) has a flanged disk (12) at least on the end where the brake device is located.

10. Cassette in accordance with claim 9, characterized in that the flanged disc (12) has a flange (29) oriented outwardly in the axial direction, against which the brake device generates the friction lock.

11. Cassette in accordance with claim 10, characterized in that the flange (29) is located in the region of the greatest diameter of the flanged disc (12).

12. Cassette in accordance with claim 10, characterized in that the surface of the flange (29) facing the end wall has a structure that increases friction, in particular, radial grooves.

* * * * *